US000001833H

United States Statutory Invention Registration [19]

[11] Reg. Number: H1,833

Hoppel et al.

[45] Published: Feb. 1, 2000

[54] APPARATUS FOR ABSORBING MINE BLAST ENERGY

[75] Inventors: Christopher P. R. Hoppel, Havre de Grace; Bruce P. Burns, Churchville, both of Md.; James F. Newill, Bear, Del.

[73] Assignee: The United States of America as represented by the Secretary of the Army, Washington, D.C.

[21] Appl. No.: 08/778,063

[22] Filed: Dec. 18, 1996

[51] Int. Cl.[7] ..... B60M 2/02

[52] U.S. Cl. ..... 296/68.1; 296/189; 297/216.17; 188/377; 248/548

[58] Field of Search ..... 296/68.1, 189; 297/216.1, 216.16, 216.17, 216.2; 188/376, 377; 248/548, 636

[56] References Cited

U.S. PATENT DOCUMENTS

| | | | |
|---|---|---|---|
| 3,428,150 | 2/1969 | Muspratt | 188/377 X |
| 4,204,659 | 5/1980 | Phillips et al. | 188/376 X |
| 4,336,868 | 6/1982 | Wilson et al. | 188/376 |
| 5,035,307 | 7/1991 | Sadeghi et al. | 188/372 |
| 5,264,259 | 11/1993 | Satoh et al. | 248/636 X |

OTHER PUBLICATIONS

P.C. Chan, K.K. Kan, D.W. Long, and J.H. Stuhmiller, "Soldier Vulnerability to Land Mine Explosions ", JAYCOR Final Report for U.S. Army Communiations and Electronics Command (CECOM), Night Vision and Electronic Sensors Directorate, Ft. Belvoir, VA Contract No. DAAK70–94–C–001 Apr. 12, 1995, pp. 34, 36–37.

D. Hull, "A Unified Approach to Progressive Crushing of Fibre–Reinforced Composite Tubes", *Composites Science and Technology*, V.40, pp. 377–421 1991, United Kingdom.

W.H. Tao, R.E. Robertson, P.H. Thorton, "Effects of Material Properties and Crush Conditions on the Crush Energy Absorption of Fiber Composite Rods", *Composites Science and Technology*, V. 47, pp. 405–418, 1993, United Kingdom.

H.G.S.J. Thuis and V.H. Metz, "The Influence of Trigger Configurations and Laminate Layd–Up on the Failure Mode of Composite Crush Cylinders", *Composite Structures*, V.28, pp. 131–137, 1994, United Kingdom.

H.F. Mahmood, and A. Bhimaraddi, "Prediction of Deep Collapse Strength Characteristics of Components Made–Up of E–Glass/Epoxy Laminates", Advanced Composites Technologies Conference Proceedings, Published by ESD, The Engineering Society, Dearborn, MI, 1993, pp. 387–401.

*Primary Examiner*—Charles T. Jordan
*Assistant Examiner*—Meena Chelliah
*Attorney, Agent, or Firm*—Paul S. Clohan, Jr.; Mark D. Kelly

[57] ABSTRACT

The invention reduces the amount of force and acceleration transmitted to the vehicle occupant in a vehicle subject to the shock of a land mine explosion. In the invention, a set of crushable composite tubes are placed between the vehicle floor and the seat of the vehicle. As the floor moves due to the blast loading, the crushable tubes deform, absorbing the energy of the blast and reducing the acceleration transmitted to the seated occupant.

5 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR ABSORBING MINE BLAST ENERGY

BACKGROUND OF THE INVENTION

The present invention relates in general to the absorption of energy associated with a an explosion or sudden impact, and, in particular, to reducing the amount of force (acceleration) transmitted to a seated occupant as a result of a mine blast.

There is currently a great deal of interest in improving the safety of vehicles subject to mine blast loading. Land mine explosions pose two serious threats to vehicle occupants. First, the mines may contain projectiles which penetrate the underside of the vehicle and strike the occupants. Secondly, the blast energy can cause very high accelerations to be imparted to the occupants. Many research efforts have centered on adding armor to the underside of a vehicle to reduce the penetration of projectiles and to either divert or absorb the energy associated with a mine blast event. However, the ultimate goal is to protect the individual occupants. The most efficient way to provide this protection, within space and weight limitations, may be to provide local protection to each individual occupant.

The current seat configuration for the Army's M923A2 5-ton truck is shown in FIG. 1. The seat 10 is attached to a pedestal 12 which is attached to the vehicle floor 13. The seat pedestal 12 contains an assembly 15 to adjust the location of the seat. The occupant 14 is attached to the seat with a four point restraint system (not shown) to provide stability in the event of an accident. In the event of a land mine blast, this seat configuration can transmit a great deal of the blast energy to the occupant 14.

In a Jun. 3, 1994 test of the M923A2 5-ton truck subject to a land mine explosion under the driver, the mannequin in the driver's seat was subject to an acceleration of 75 times that of gravity for 1 millisecond, and sustained accelerations of approximately 25 times the acceleration of gravity for over 30 milliseconds. See P. C. Chan, K. K. Kan, D. W. Long, and J. H. Stuhmiller, "Soldier Vulnerability to Land Mine Explosions," JAYCOR Final Report for U.S. Army Communications and Electronics Command (CECOM), Night Vision and Electronic Sensors Directorate, Fort Belvoir, Va., Contract Number DAAK70-94-C-0012, April 1995. These accelerations were measured by accelerometers in the mannequin's pelvis and neck regions and are clearly above the threshold for serious spinal injury to humans.

SUMMARY OF THE INVENTION

It is an object of the present invention to reduce the amount of force (acceleration) transmitted to a seated occupant.

This and other objects of the invention are achieved by an apparatus for reducing the force transmitted to a seated occupant in a vehicle comprising a vehicle floor; a seat attached to the vehicle floor; and at least one crush tube disposed between the vehicle floor and the seat.

In a preferred embodiment, the number of crush tubes is four.

The apparatus may further comprise a seat pedestal for attaching the seat to the vehicle floor.

Another aspect of the invention is an apparatus for reducing the force transmitted to a seated occupant in a vehicle comprising a vehicle floor; a seat attached to the vehicle floor; a seat pedestal for attaching the seat to the vehicle floor; a vehicle wall; and at least one crush tube horizontally disposed between the vehicle wall and the seat.

Preferably, the crush tubes are fiber reinforced composite structures.

Other objects, features and advantages of the invention will become apparent from the following detailed description taken in conjunction with the accompanying drawings.

DETAILED DESCRIPTION OF THE PREFERRED EMBODIMENTS

The invention includes a method of absorbing energy associated with an explosion or sudden impact, and, in particular, with a mine blast. One specific application is to reduce the amount of force (acceleration) transmitted to a seated occupant. The energy is absorbed by crushing a cylinder or tube made of composite material. The tubes will crush, thus transmitting only a portion of the mine blast energy to the seated occupant and reducing the maximum force transmitted to the occupant. The invention is described in the context of a 5-ton Army truck seat, but it is applicable to any vehicle system, whether land, sea or air based.

The invention reduces the amount of force and acceleration transmitted to a vehicle occupant in a vehicle subject to the shock of a land mine explosion. In the invention, a set of crushable composite tubes are placed between the vehicle floor and the seat of the vehicle. As the floor moves due to the blast loading, the crushable tubes will deform, absorbing the energy of the blast and reducing the acceleration transmitted to the seated occupant.

A considerable amount of research has been presented in the open literature on the analysis of composite tubes designed to absorb crush energy. See, e.g., D. Hull, "A Unified Approach to Progressive Crushing of Fibre-Reinforced Composite Tubes", *Composites Science and Technology,* V. 40, pp. 377–421, 1991; W. H. Tao, R. E. Robertson, P. H. Thorton, "Effects of Material Properties and Crush Conditions on the Crush Energy Absorption of Fiber Composite Rods", *Composites Science and Technology,* V. 47, pp. 405–418, 1993; H. G. S. J. Thuis and V. H. Metz, "The Influence of Trigger Configurations and Laminate Lay-up on the Failure Mode of Composite Crush Cylinders", *Composite Structures,* V.25, pp. 37–43, 1993; H. F. Mahmood, and A. Bhimaraddi, "Prediction of Deep Collapse Strength Characteristics of Components Made-Up of E-Glass/Epoxy Laminates", *Advanced Composites Technologies Conference Proceedings,* Published by ESD, The Engineering Society, Dearborn, Mich., 1993, pp. 387–401; G. L. Farley and R. M. Jones, "The Energy-Absorption Capability of Composite Crush Tubes and Beams", NASA Technical Memorandum 101634, AVSCOM Technical Report 89-B-003, September 1989.

In general, the purpose of a crushable tube is to absorb energy through the progressive deformation or fracture of a material. This process can be enhanced and controlled through the use of composite materials in the construction of the crush tube.

Figure 1:
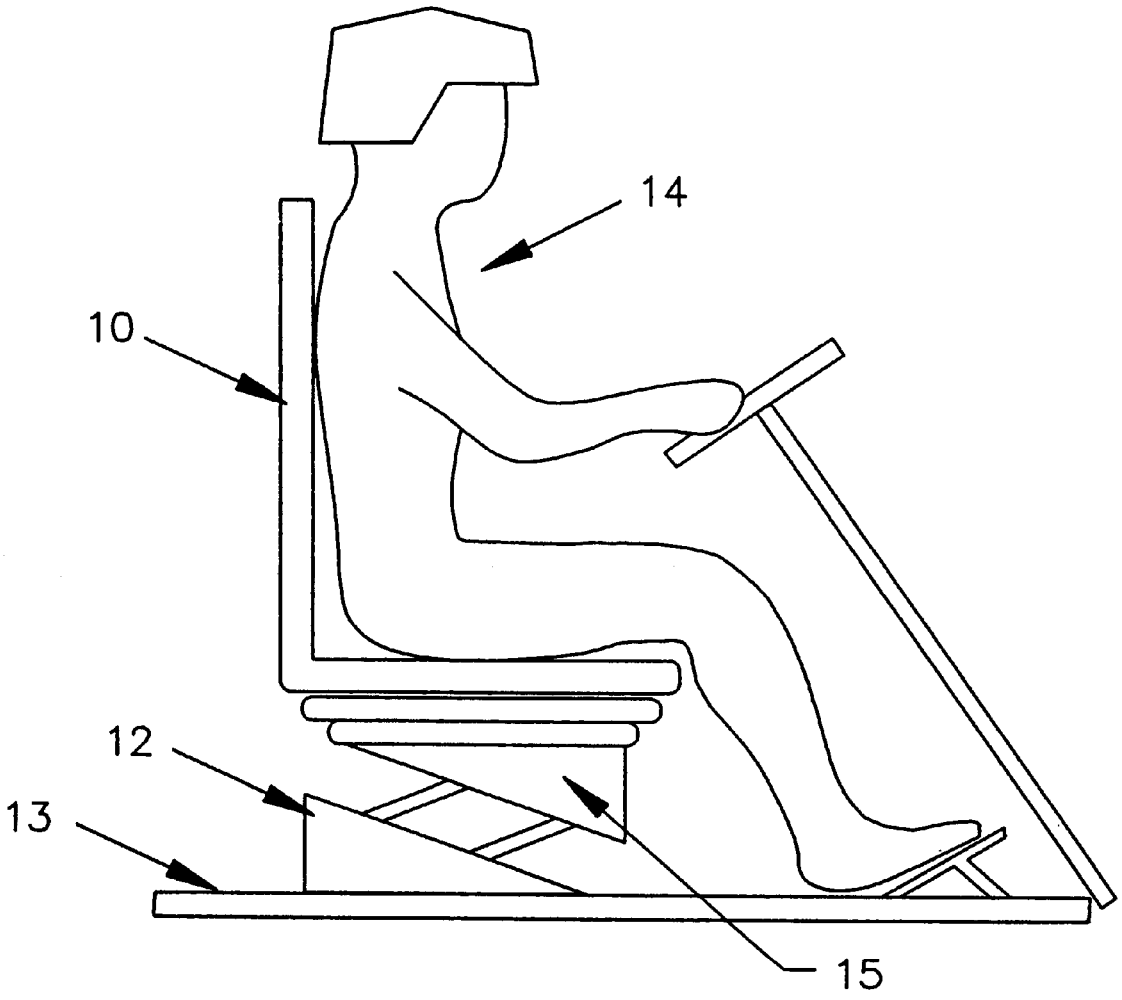
FIG. 1 shows the seat pedestal and armor bucket seat for the Army's M923A2 5-ton truck.
Figure 2:
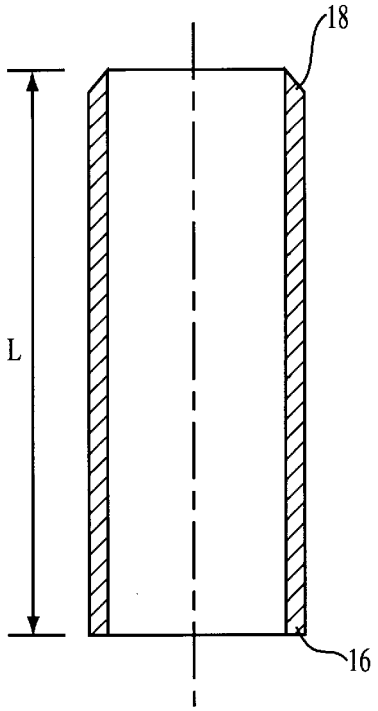
FIG. 2 schematically shows a crush tube with a chamfer at one end.
Figure 3:
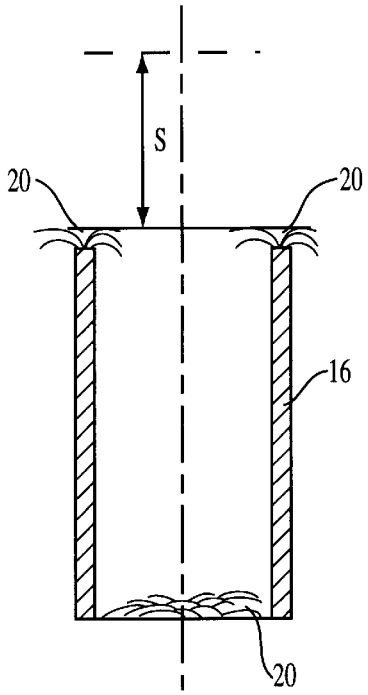
FIG. 3 schematically shows a partially crushed tube.

FIG. 2 shows a representative crush tube 16 of length L having chamfered end 18. The crush tube 16 is manufactured such that thin fibers (for example, approximately 10 micrometers in diameter) are aligned in the axial direction of the tube 16 and the fibers are held in place by a matrix material. The fibers are made of a strong and stiff material such as graphite (carbon), glass, aramid, or Boron. The matrix is usually made of a polymeric material such as epoxy, polyester, polyimide, or urethane rubber.

A crushable composite tube 16 may be made with a process such as pultrusion, where the fibers are pulled through a liquid bath of heated polymer resin, then through a mold in the shape of the final part. The polymer resin hardens as it cools (if it is a thermoplastic polymer) or cross-links (if it is a thermoset polymer) to form the final part structure.

A crushable tube 16 may also be made by a process such as filament winding where fibers are coated with the polymer material and wrapped around a mandrel (usually a metal tube that rotates). The polymer material is either heated 1) before it is applied to the mandrel, 2) while it is being applied, or 3) after it is applied. The polymer material is then cooled to allow hardening of the matrix. The fibers may be oriented at any angle between 0 degrees (along the axial direction) and 90 degrees (along the circumferential direction). Filament winding may be used in conjunction with the pultrusion process to wind over a pultruded part. The wound layers would then provide circumferential support to the structure and increase the axial strength.

The crush tube 16 shown in FIG. 2 is designed with a chamfered end 18 to act as a trigger mechanism to initiate crushing. Alternative trigger mechanisms are described in H. G. S. J. Thuis and V. H. Metz, "The Influence of Trigger Configurations and Laminate Lay-up on the Failure Mode of Composite Crush Cylinders", *Composite Structures,* V.25, pp. 37–43, 1993.

Figure 4:
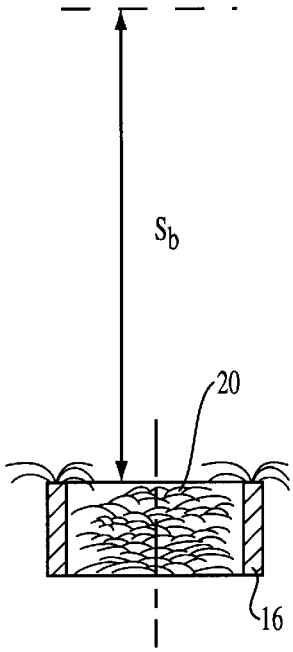
FIG. 4 schematically shows a fully crushed tube with debris compacted inside to help prevent further crushing.

As the tube 16 is loaded in compression in the axial direction (S), the tube material is displaced in the radial direction by a combination of mechanisms including localized fracture and bending. Crushing should continue in a stable manner until the tube 16 is fully crushed ($S_b$) (FIG. 4). The debris 20 that collects in the fully crushed tube helps prevent further crushing.

Figure 5:
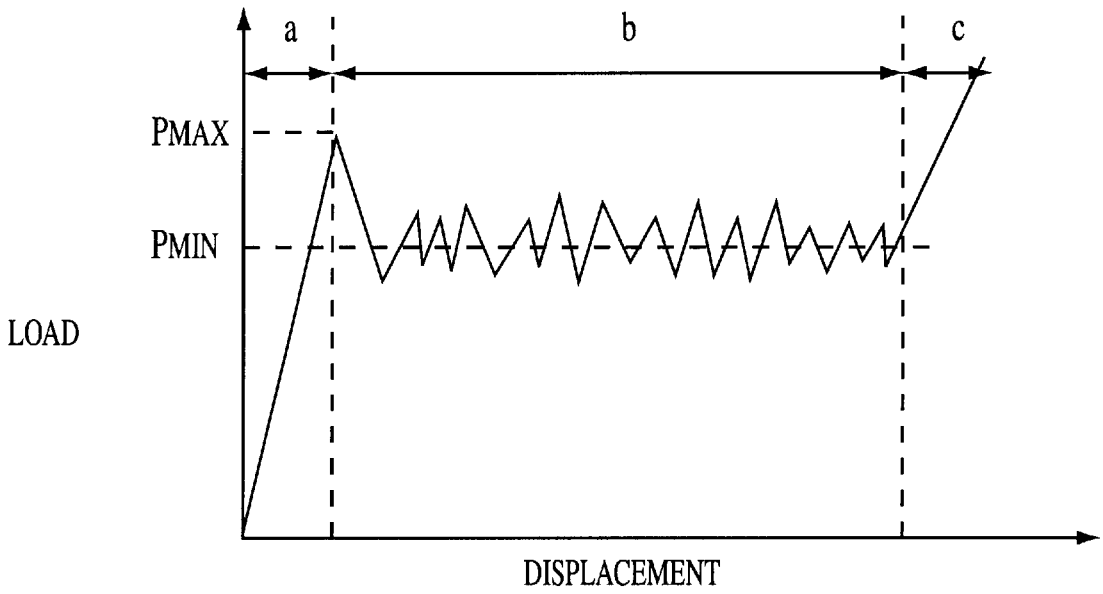
FIG. 5 is a typical load-displacement curve of a tube with a chamfered end undergoing progressive crushing.

FIG. 5 shows a representative load versus displacement curve for the crushing process. Generally some initial load ($P_{MAX}$) is applied to the tube 16 to initiate crushing (stage a). Once crushing is initiated (stage b), the material should absorb energy at a fairly constant rate ($P_{MIN}$) as the tube 16 is crushed. Once the tube 16 is fully crushed (stage c), the load increases as the material is compacted. In general, a crush tube 16 should absorb the required amount of energy before it is fully compacted.

Figure 6:
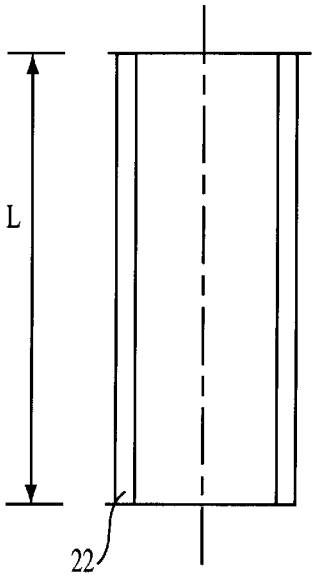
FIGS. 6, 7, and 8 are a schematic representation of a tube undergoing progressive folding.
Figure 7:
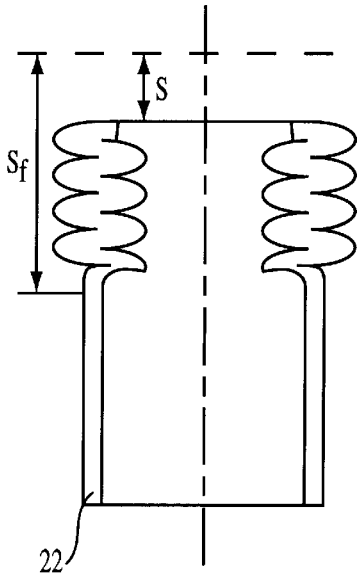
Figure 8:
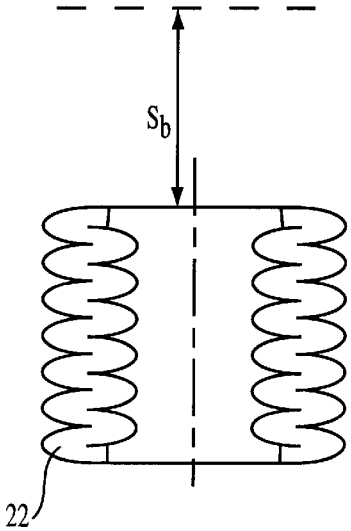
Figure 9:
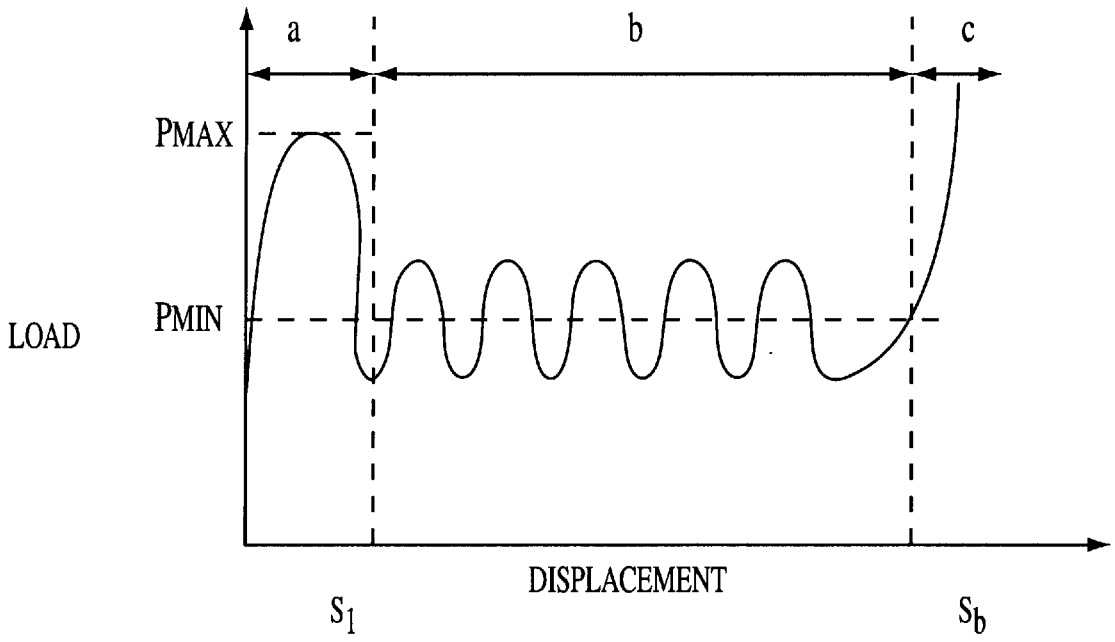
FIG. 9 is a typical load-displacement curve of a tube undergoing progressive compacting.

Crush tubes 22 can also be manufactured to absorb energy by progressive folding of the material as shown in FIGS. 6, 7 and 8. FIG. 6 shows a tube 22 prior to loading. FIG. 7 shows a partially compacted tube (compacted a distance $S_f$ as shown in FIG. 7) and FIG. 8 shows a fully compacted tube. A load versus displacement curve for progressive folding is shown in FIG. 9. The progressive folding process is similar to the progressive crushing failure except that very little material fracture occurs during the deformation process. $S_1$ in FIG. 9 represents the point at which compaction begins and the crush tube starts absorbing energy.

Calculations have been performed to verify that it is feasible for a crushable tube to reduce the acceleration transmitted to a seated occupant of a vehicle that hits a land mine. For this example case, a set of crush tubes are designed such that the maximum acceleration for the occupant will be 10 times the acceleration of gravity (this appears to be an acceptable level of acceleration for a constrained, seated occupant for a duration of up to 50 milliseconds).

Figure 10:
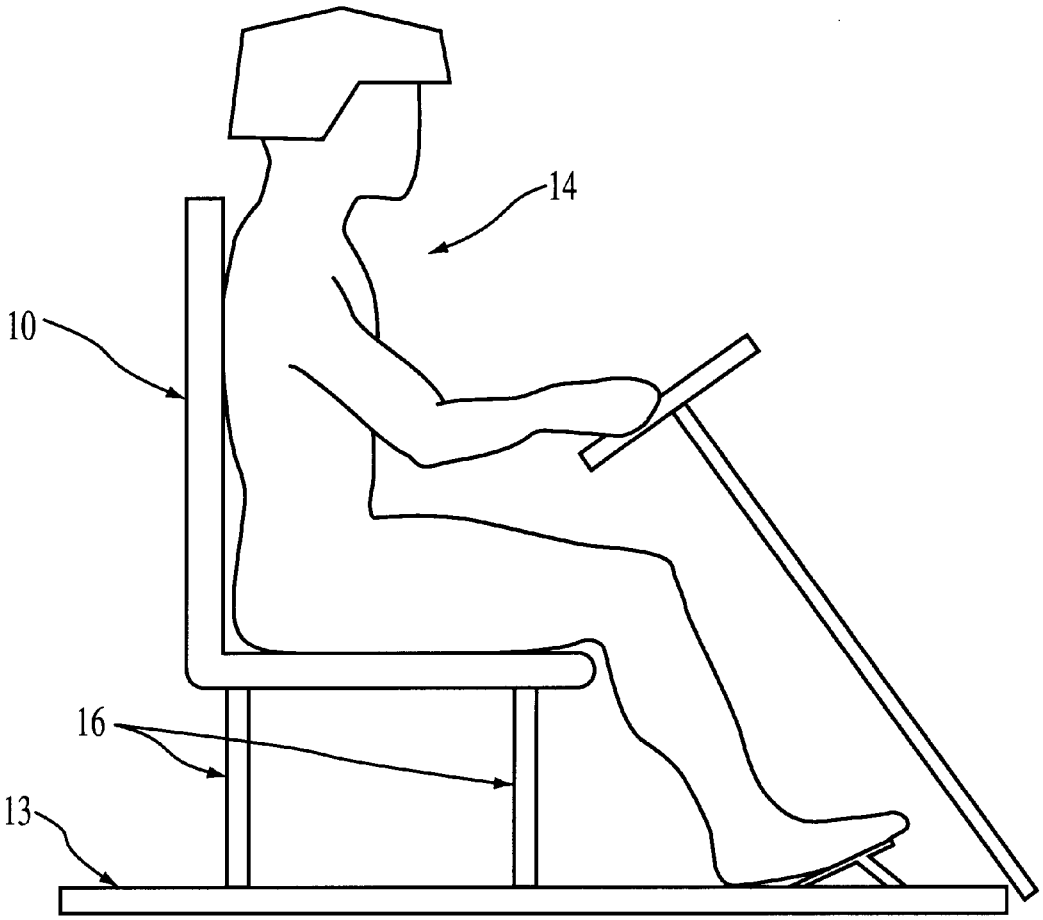
FIG. 10 shows four crush tubes in place under a seat.

Four crush tubes 16 are placed between the seat 10 and the floor 13 of the vehicle as shown in FIG. 10. Although there appear to be only two tubes 16 in FIG. 10, it will be understood that two of the tubes 16 are not visible because they are located into the plane of the paper directly behind the two visible tubes 16. For this example, it will be assumed that the mass of the occupant 14 is 91 kg (200 lbs.) and the mass of the seat 10 is 68 kg (150 lbs.), for a total mass of 159 kg (350 lbs.). The amount of force that the crush tubes 16 can transmit to the occupant 14 is then equal to the mass times the maximum acceleration. As stated before, the maximum allowable acceleration is 10 times the acceleration of gravity or 98.1 meters/second$^2$. The total force is then 15.6 kN. Each of the four crush tubes 16 will then absorb 3.9 kN of force. Tao, Robertson, and Thorton, supra, have shown that tubes made with continuous fiber reinforced E-glass fibers in a vinyl ester matrix with an outer diameter of 7 mm and inner diameter of 5 mm can be crushed with a fairly constant crush load of 4.0 kN.

During the time that the tubes 16 are absorbing energy, the floor 13 of the vehicle will be accelerating upwards with the acceleration profile described supra (75 g's for less than 1 millisecond and 25 g's for 30 milliseconds). The floor 13 will be displaced as described by equation 1:

$$d=v_0+0.5^{at^2} \tag{1}$$

where d is the distance the floor 13 will travel, a is the upwards acceleration of the floor and t is the amount of time that passes and $v_0$ is the initial velocity. According to equation 1, during the first 31 milliseconds of the mine blast event, the floor 13 will be displaced approximately 0.132 meters. During this same time, if all of the crush tubes 16 are transmitting their maximum load and the seated occupant 14 is being accelerated upwards at 10 g's, the occupant 14 will be displaced 0.047 meters. Thus, after 31 milliseconds, the floor 13 will be 0.086 meters closer to the occupant's seat 10. The crush tubes 16 should then be at least 0.086 meters in length. Longer crush tubes may be desirable in the event that more energy (due to a larger mine or an explosion closer to the occupant) may need to be absorbed.

One concern in using long crush tubes is that if they became too long they would experience buckling before crushing, thus reducing their energy absorbing capabilities.

Two modes of buckling are addressed below: Euler buckling and cylindrical shell buckling.

The critical load for Euler buckling for a column hinged at both ends is described by equation 2.

$$P = \frac{EI\pi^2}{L^2} \tag{2}$$

$E_{11}$=60.7 GPa
I=0.373×$10^{-9}$ $m^4$
L=0.09 m
$D_o$=0.01 m
$D_i$=0.007 m where P is the applied load, E is the axial Elastic modulus of the material, I is the moment of inertia of the column, π is the ratio of the circumference to the diameter of a circle, and L is the length of the column. From Equation 2, it can be calculated that the buckling stress is 689 MPa.

The critical load for cylindrical shell buckling (in N/m) is described by equation 3.

$$N_x = \frac{\pi^2 D_{11}}{L^2} m^2 \left(1 + \frac{D_{12}\beta^2}{D_{11}} + \frac{D_{22}\beta^4}{D_{11}}\right) + \frac{\gamma^2 L^4}{\pi^4 m^2 D_{11} R^2}\left[\frac{A_{11}A_{22} - A_{12}^2}{A_{11} + \left(\frac{A_{11}A_{22} - A_{12}^2}{A_{66}} - 2A_{12}\right)\beta^2 + A_{22}\beta^4}\right] \tag{3}$$

$$\beta = \frac{nL}{\pi R m}$$

$$\gamma = 1 - .901 * (1 - e^{\phi})$$

$$\phi = \frac{1}{29.8}\sqrt{\frac{R}{\sqrt[4]{\frac{D_{11}D_{22}}{A_{11}A_{22}}}}}$$

$A_{11}$=1.861×$10^8$ N/m
$A_{22}$=7.604×$10^7$ N/m
$A_{12}$=1.749×$10^7$ N/m
$A_{66}$=3.597×$10^7$ N/m
$D_{11}$=139.59 Nm
$D_{12}$=13.12 Nm
$D_{22}$=57.03 Nm

The A and D quantities are the standard constitutive relations for a thin walled composite material. Minimizing this expression for the proper buckling mode, i.e., proper choice of m and n, yields a buckling stress of 12490 MPa. While the choice of m and n will vary from case to case, in the above example, m=7 and n=1.

Comparison of the two buckling stresses with the applied stress of 90 MPa shows that buckling is not a problem.

Figure 11:
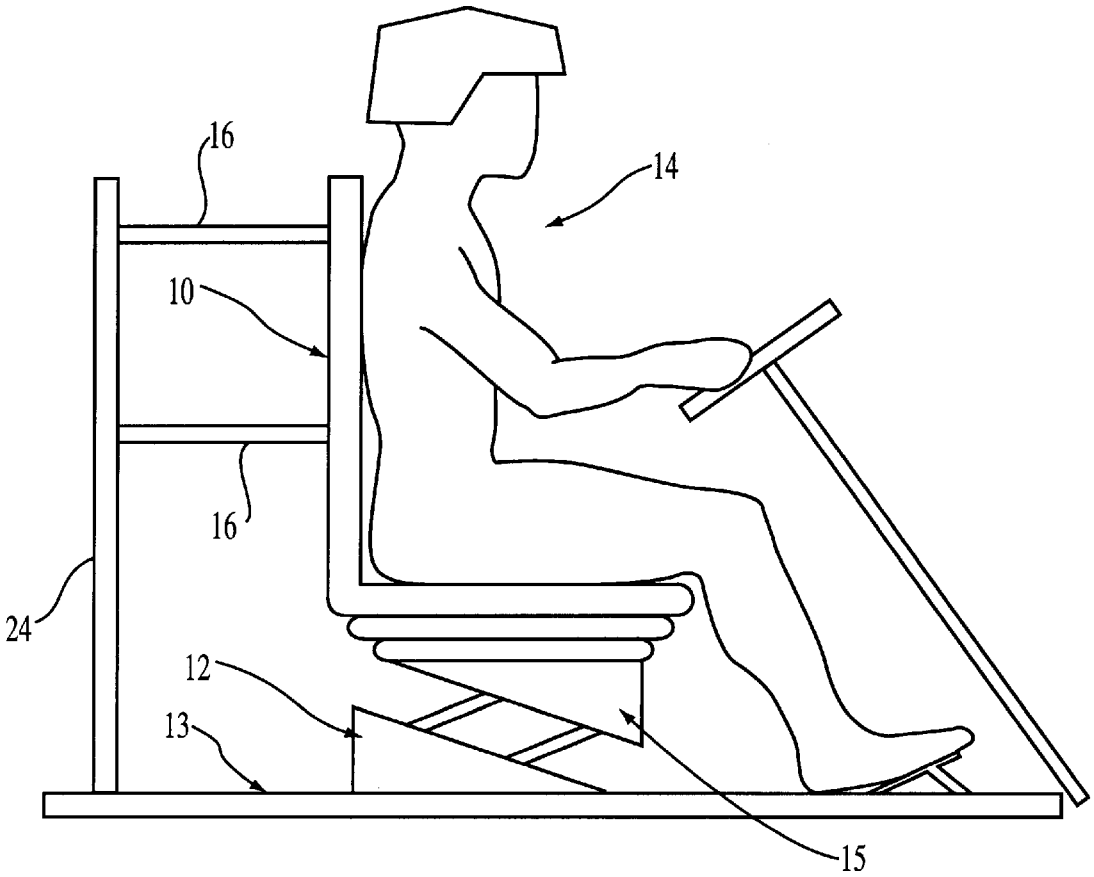
FIG. 11 shows crush tubes used to absorb horizontal accelerations.

While the invention has been described to reduce the vertical component of the acceleration imparted to the vehicle by the land mine explosion, crush tubes can also be designed to reduce the horizontal component of the acceleration. Land mine explosions can also cause significant horizontal accelerations on the vehicle occupants. Crush tubes 16 may be placed on the backside of the seat 10 as shown in FIG. 11 to absorb energy in the horizontal directions. The horizontal tubes 16 are attached to a fixed vertical member, such as a vehicle wall 24.

Figure 12:
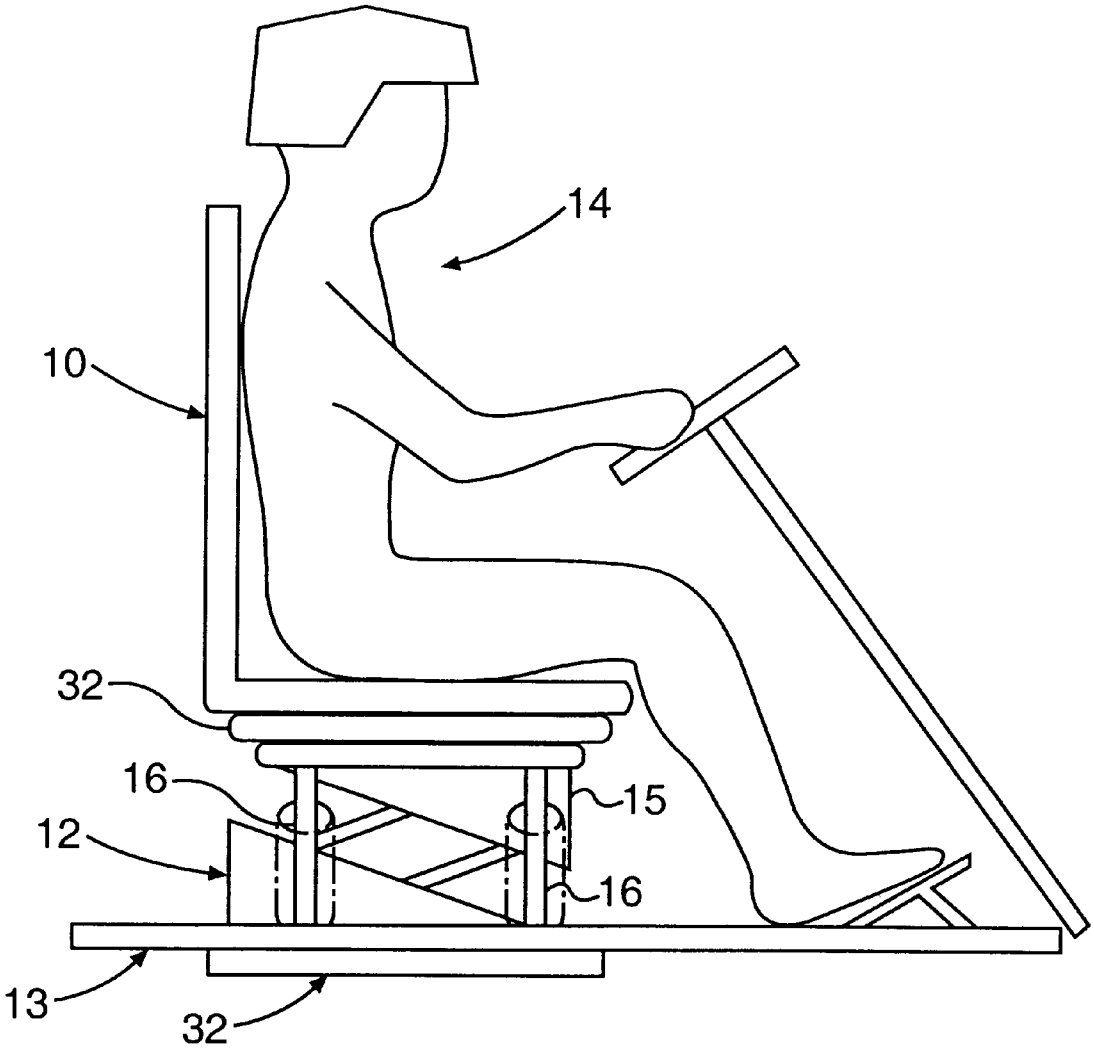
FIG. 12 shows crush tubes with a conventional seat pedestal.

In FIG. 10, the crush tubes 16 are shown as a replacement for the existing standard seat pedestal 12. Crush tubes 16 can also be used in conjunction with the existing seat pedestal 12 as shown in FIG. 12. The crush tubes 16 are offset slightly from the seat 10 so that the seat 10 can be adjusted using the standard seat pedestal. However, the energy to deform the seat pedestal 12 should be minimized to reduce the total acceleration imparted to the occupant 14.

FIG. 12 also shows armor 32 which may be attached to the seat 10 or the vehicle floor 13 to provide additional protection against fragments or penetrating objects.

Figure 13:
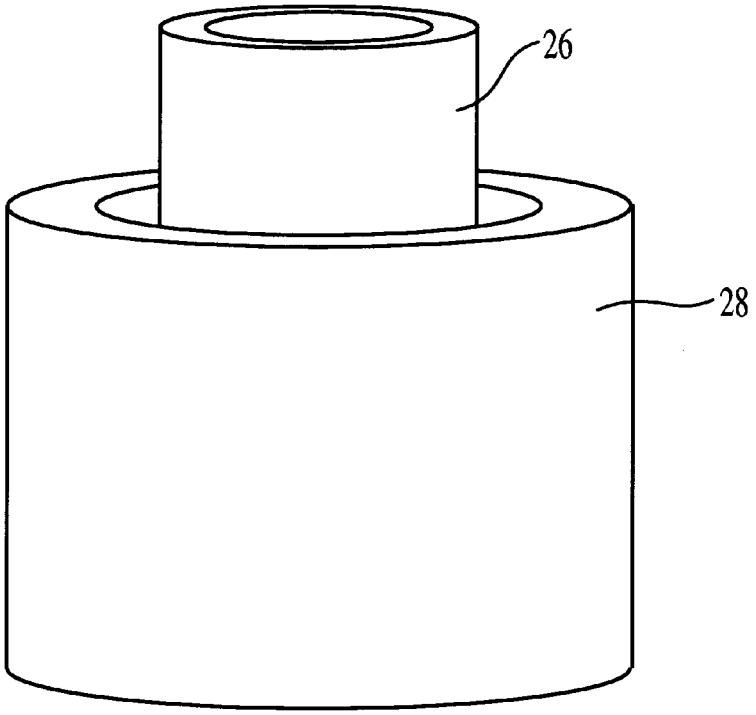
FIG. 13 shows aligned concentric crush tubes.

As shown in FIG. 13, two crush tubes 26, 28 may be aligned concentricly such that each crush tube 26,28 carries a portion of the force. In addition, the axial length of crush tube 26 may be different than the axial length of the crush tube 28 such that the crush tube 26 is loaded before the tube 28. In this type of system, the deformation rate can be controlled such that if one of the tubes 26,28 fails to absorb the required energy, the other tube(s) becomes more stiff as it(they) deforms, thus absorbing the required energy.

Figure 14:
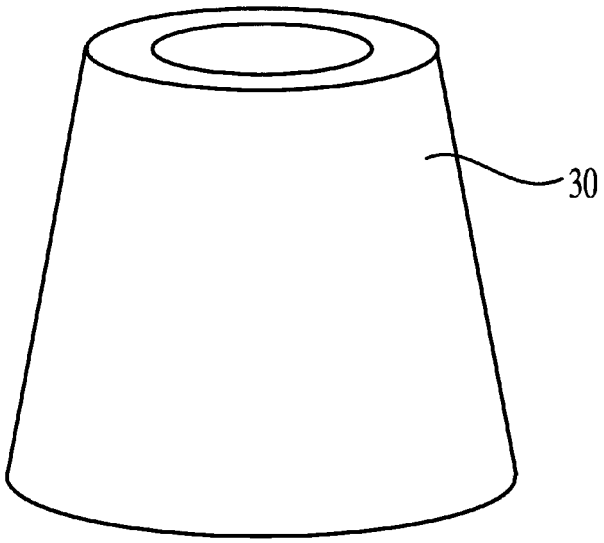
FIG. 14 shows another embodiment of a crush tube.
Figure 15:
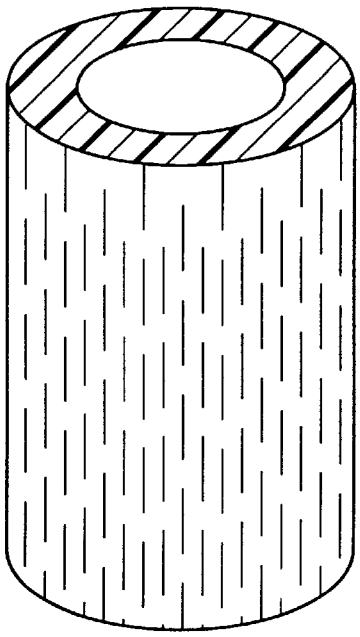
FIG. 15 shows a crush tube made of discontinuous fibers in a polymer matrix.
Figure 16:
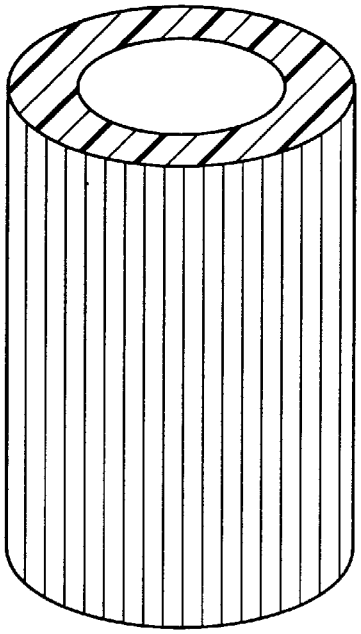
FIG. 16 shows a crush tube made of continuous fibers in a polymer matrix.

It is also possible to construct the composite tube with varying material properties to control the rate of energy absorption along the length. Constructing the composite tube with varying geometry or architecture is another way to control the rate of energy absorption. For example, FIG. 14 shows a crush tube 30 in the shape of a cone.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for reducing force from an exploding mine, transmitted to a seated occupant in a vehicle, the apparatus comprising:

a vehicle floor;

a seat attached to the vehicle floor;

armor attached to the seat;

armor attached to the floor;

a seat pedestal for attaching the seat to the vehicle floor;

at least one crush tube for absorbing energy from the exploding mine disposed between the vehicle floor and the seat;

wherein the at least one crush tube is a fiber-reinforced composite structure comprising thin fibers of a strong and stiff material, in a polymer matrix, such fibers aligned along the axial direction of the at least one crush tube;

further comprising a second crush tube which is concentric with the at least one crush tube such that each crush tube carries a portion of the force;

wherein an axial length of the second crush tube is different from an axial length of the at least one crush tube such that one crush tube is loaded before the other.

2. The apparatus of claim 1, wherein the at least one crush tube is disposed vertically between the vehicle floor and the seat.

3. The apparatus of claim 1, wherein the fibers comprise continuous fibers in a polymer matrix.

4. The apparatus of claim 1, wherein the at least one crush tube is made of discontinuous fibers in a polymer matrix.

5. An apparatus for reducing force from an exploding mine or the like, transmitted to a seated occupant in a vehicle, the apparatus comprising:

a vehicle floor;

a seat attached to the vehicle floor;

armor attached to the seat;

armor attached to the floor;

a seat pedestal for attaching the seat to the vehicle floor;

at least one crush tube for absorbing energy from the exploding mine disposed between the vehicle floor and the seat;

wherein the at least one crush tube is a fiber-reinforced composite structure comprising thin fibers of a strong and stiff material such as graphite, glass, Aramid, or boron, in a polymer matrix, such fibers aligned along the axial direction of the at least one crush tube;

wherein the at least one crush tube is cone-shaped so that energy absorbed varies with time.

* * * * *